US008939827B2

(12) United States Patent
Boudreau et al.

(10) Patent No.: US 8,939,827 B2
(45) Date of Patent: Jan. 27, 2015

(54) METHOD AND APPARATUS FOR CONTROLLING VENTILATION SYSTEMS

(75) Inventors: Patrick Paul Boudreau, Dieppe (CA); Michael Boulay, Dieppe (CA)

(73) Assignee: Air Tech Equipment Ltd., New Brunswick (CA)

( * ) Notice: Subject to any disclaimer, the term of this patent is extended or adjusted under 35 U.S.C. 154(b) by 1374 days.

(21) Appl. No.: 12/671,819

(22) PCT Filed: Jul. 31, 2008

(86) PCT No.: PCT/CA2008/001399
§ 371 (c)(1),
(2), (4) Date: Jun. 4, 2010

(87) PCT Pub. No.: WO2009/018652
PCT Pub. Date: Feb. 12, 2009

(65) Prior Publication Data
US 2010/0286831 A1    Nov. 11, 2010

(30) Foreign Application Priority Data

Aug. 3, 2007    (CA) ...................................... 2596151

(51) Int. Cl.
*F24F 7/08*        (2006.01)
*F24F 7/007*       (2006.01)
(Continued)

(52) U.S. Cl.
CPC ............ *F24F 12/006* (2013.01); *F24F 11/0079* (2013.01); *Y02B 30/16* (2013.01); *Y02B 30/746* (2013.01); *Y02B 30/563* (2013.01)
USPC .......................... 454/252; 236/44 C; 236/49.3

(58) Field of Classification Search
CPC ............ F24F 12/006; F24F 2011/0087; F24F 11/0001; F24F 11/0012; Y02B 30/16
USPC ................................ 236/44 C, 49.3; 454/252
See application file for complete search history.

(56) References Cited

U.S. PATENT DOCUMENTS 4,554,491 A * 11/1985 Plunkett .................. 318/400.41
5,002,118 A *  3/1991 Olmstead et al. ............... 165/54
(Continued)

FOREIGN PATENT DOCUMENTS

WO      03/036182 A1    5/2003
WO      2007/051286 A1  5/2007

OTHER PUBLICATIONS

International Search Report and Written Opinion dated Oct. 17, 2008 pertaining to International application No. PCT/CA2008/001399.
(Continued)

*Primary Examiner* — John K Fristoe, Jr.
*Assistant Examiner* — Frederick D Soski
(74) *Attorney, Agent, or Firm* — Dinsmore & Shohl LLP

(57) ABSTRACT

An energy recovery ventilation system is described which allows for continuous fan speed control through pulse width modulation of direct current fans. The energy recovery ventilation described is capable of fine motor speed control without the disadvantages of high noise, low efficiency and a fixed number of speeds present in commonly-used speed-varying techniques used with alternating current (AC) fans. This may be accomplished through the use of direct current (DC) fans and pulse width modulation. A controller is used to optimize the ventilation and energy efficiency of the system through the use of several temperature sensors. The energy recovery ventilation also provides a control process for self-optimization of the energy recovery ventilation, in case the supply and exhaust airflows are unequal. An unbalance may be detected by calculating the thermal efficiencies of the exhaust and supply airflows.

9 Claims, 11 Drawing Sheets

(51) Int. Cl.
    *F24F 3/147*     (2006.01)
    *F24F 12/00*     (2006.01)
    *F24F 11/00*     (2006.01)

(56) References Cited

U.S. PATENT DOCUMENTS

| | | | | |
|---|---|---|---|---|
| 5,024,263 A | * | 6/1991 | Laine et al. | 165/283 |
| 5,082,173 A | * | 1/1992 | Poehlman et al. | 236/11 |
| 5,193,610 A | * | 3/1993 | Morissette et al. | 165/54 |
| 5,257,736 A | * | 11/1993 | Roy | 236/49.3 |
| 5,395,042 A | * | 3/1995 | Riley et al. | 236/46 R |
| 5,902,183 A | * | 5/1999 | D'Souza | 454/258 |
| 7,156,317 B1 | * | 1/2007 | Moore | 236/49.3 |
| 7,231,967 B2 | * | 6/2007 | Haglid | 165/231 |
| 2003/0157882 A1 | * | 8/2003 | Boulanger et al. | 454/256 |
| 2004/0177627 A1 | | 9/2004 | Fujimoto | |
| 2006/0219381 A1 | * | 10/2006 | Lagace et al. | 165/8 |

OTHER PUBLICATIONS

International Preliminary Report on Patentability dated Feb. 18, 2010 to International application No. PCT/CA2008/001399.

* cited by examiner

METHOD AND APPARATUS FOR CONTROLLING VENTILATION SYSTEMS

RELATED APPLICATION

This application claims the benefit of Canadian Patent Application No. 2,596,151, filed Aug. 3, 2007.

FIELD OF THE INVENTION

The present invention generally relates to ventilation systems such as energy recovery ventilators and to methods and apparatus for controlling such ventilation systems.

BACKGROUND OF THE INVENTION

Current energy recovery ventilators rely on alternating current (AC) fans. Speed control of AC motors is generally accomplished using tapped transformers, triacs, capacitors or induction coils. These existing solutions present several inconveniences including a limited number of speeds, excessive noise and vibration due to harmonics and reduced energy efficiency. In addition, these techniques also allow for a low number of fan speeds, typically three, which can result in lower ventilation efficiency.

Furthermore, installed ventilation systems often exhibit lower ventilation efficiency than was measured during product testing, resulting in a suboptimal amount of sensible and latent energy being transferred between the exhaust and supply airflows. This is due in part to unbalanced supply and exhaust airflows. A number of factors can lead to this unbalance, including the length and type of the air ducts leading to and from the ventilator and dirty air filters blocking the flow of air. Current ventilation systems do not provide a means for detecting and automatically correcting unbalanced airflows.

Another issue affecting the performance of ventilation systems is the lack of real-time data concerning indoor and outdoor atmospheric conditions to be used in control algorithms. Current systems do not incorporate the means (for example, but not limited to, sensors) necessary for the automated, optimized control of a ventilation system, based on outdoor and indoor environmental conditions.

As a result, there remains a need for a device allowing for fine control of fan speeds and runtime optimization of the airflows entering and exiting a building.

BRIEF SUMMARY OF THE INVENTION

In accordance with an aspect of the present invention, there is provided a ventilation system with a ventilator. A first direct current (DC) fan draws air from an exterior of a building for circulation into an interior of the building, and produces a supply airflow through the ventilator. A second DC fan draws a return air from the interior of the building for exhausting to the exterior of the building, and produces an exhaust airflow through the ventilator enclosure. The supply airflow and the exhaust airflow undergoing an energy exchange in the ventilator. A controller controls the speeds of the DC fans, thereby separately adjusting the supply airflow and the exhaust airflow in response to an input received from a temperature sensor in the supply airflow positioned upstream of the energy exchange in the ventilator, and an input received from another temperature sensor in the supply airflow positioned downstream of the energy exchange in the ventilator and a third temperature sensor in an exhaust airflow positioned downstream of the energy exchange in the ventilator. The first, second and third temperature sensors each independently outputs a signal to the controller for use in optimizing the supply and exhaust airflows.

Preferably, the ventilation system further comprises a humidity sensor in the supply airflow positioned upstream of energy exchange in the ventilator and another humidity sensor in the supply airflow positioned downstream of energy exchange in the ventilator. The sensors each independently outputs a signal to the controller for use in optimizing the supply airflow and the exhaust airflow.

Preferably, the supply airflow and the exhaust airflow are optimized through balancing the supply airflow and the exhaust airflow.

Preferably, the ventilator comprises at least one energy exchange core.

Preferably, the energy exchange core is a heat exchange core.

Preferably, the energy exchange core is an enthalpy exchange core.

Preferably, the supply airflow and the exhaust airflow are mixed in the ventilator.

Preferably, the supply airflow and the exhaust airflow are substantially separate in the ventilator, and the heat and/or moisture exchange occurs between the supply and exhaust airflows.

Preferably, the ventilation system further comprises a recirculation fan for drawing a portion of the return air from the interior of the building for recirculation in the interior of the building.

Preferably, one of the temperature sensors is positioned in the supply airflow at a position proximate to a supply inlet of the ventilator.

Preferably, another temperature sensor is positioned in the supply airflow at a position proximate to a supply outlet of the ventilator.

Preferably, the ventilation system further comprises a fourth temperature sensor positioned in the exhaust airflow at a position proximate to the exhaust inlet of the ventilator. The fourth temperature sensor outputs a signal to the controller for use in optimizing the supply and exhaust airflows.

Preferably, the humidity sensors in the supply airflow are upstream at a position proximate to a supply inlet of the ventilator and at a position proximate to a supply outlet of the ventilator, respectively.

Preferably, the controller includes means for calculating a thermal efficiency for each of the supply airflow and the exhaust airflow for use in balancing the supply and exhaust airflows.

Preferably, the optimization of the supply airflow and the exhaust airflow is performed through an optimization of the humidity levels in the supply and exhaust airflows.

Preferably, the ventilation system has continuous fan speed control.

Preferably, the means for fine control of the fan speed of each of the first and the second DC fan comprises pulse width modulation (PWM).

In accordance with another aspect of the present invention, there is provided a ventilator with a ventilator enclosure. The ventilator enclosure has a supply inlet receiving a supply airflow from an exterior of a building, a supply outlet discharging the supply airflow to an interior of the building. An exhaust inlet receives an exhaust airflow from an interior of the building. An exhaust outlet discharges the exhaust airflow to the exterior of the building. A direct current (DC) fan draws supply air through the supply inlet and discharges supply air through the supply outlet, the DC fan produces a supply airflow through the ventilator enclosure. Another DC fan draws return air through the exhaust inlet and discharges the exhaust air to the exterior of the building thereby creating the exhaust airflow through the ventilator enclosure. A temperature sensor proximate to the supply inlet measures the temperature of supply air entering the ventilator enclosure. A second temperature sensor proximate to the supply outlet measures the temperature of supply air exiting the ventilator enclosure. Another temperature sensor proximate to the exhaust outlet measures the temperature of return air exiting the ventilator enclosure. A controller controls the fans and regulates the supply airflow and the exhaust airflow. The controller comprises a receiver that receives inputs from the temperature sensors, and drivers for independently adjusting fan speeds for the DC fans and optimizing the supply airflow and the exhaust airflow.

Preferably, the ventilator further comprises an energy exchange core for exchanging heat and/or moisture between the supply airflow and the exhaust airflow.

Preferably, the energy exchange core is a heat exchange core or an enthalpy exchange core.

Preferably, the ventilator further comprises a recirculation fan for drawing a portion of return air from the interior of the building for recirculation to the exterior of the building.

Preferably, the ventilator further comprises a fourth temperature sensor positioned in the exhaust airflow at a position proximate to the exhaust inlet of the ventilator. The fourth temperature sensor outputs a signal to the controller for use in optimizing the supply air flows and the exhaust airflow.

Preferably, the ventilator further comprises humidity sensors positioned in the supply airflow at a position proximate to the supply inlet of the ventilator and proximate to the supply outlet of the ventilator, respectively. The humidity sensors each independently outputs a signal to the controller for use in optimizing the supply and exhaust airflows.

Preferably, the ventilator further optimizes the supply airflow and the exhaust airflow by balancing the supply and exhaust airflows.

Preferably, the fan speed of the DC fans is controlled by means of pulse width modulation.

In accordance with another aspect of the present invention, there is provided a method for optimizing ventilation efficiency of a ventilation system having a first direct current (DC) fan producing a supply airflow through a ventilator to an interior of a building, a second DC fan for producing an exhaust air flow of return air through a ventilator for exhausting to an exterior of the building, a first temperature sensor determining a temperature of the supply airflow upstream of the ventilator, a second temperature sensor determining a temperature of the supply airflow downstream of the ventilator, a third temperature sensor determining a temperature of the exhaust airflow downstream of the ventilator and a controller for independently adjusting the fan speed for each of the first and second DC fans in response to input received from the first, second and third temperature sensors, the method comprising the steps of: determining a thermal efficiency for the supply airflow and the exhaust airflow from temperature data for the supply airflow and the exhaust airflow obtained from each of the first, second and third temperature sensors; comparing the thermal efficiency for each of the supply airflow and the exhaust airflow with predetermined values; determining whether the thermal efficiencies for supply and exhaust airflows are substantially equal to predetermined values; and adjusting the fan speed of the first and/or the second fan where the thermal efficiencies of the supply airflow and/or the exhaust airflow are determined to be unequal.

In accordance with another aspect of the present invention, there is provided a method for self-balancing a supply airflow and an exhaust airflow in a ventilation system, the ventilation system comprising a direct current (DC) supply fan for producing a supply airflow through a ventilator for circulation inside a building, a DC exhaust fan for producing an exhaust air flow of return air through a ventilator for exhausting outside of the building, a first temperature sensor for determining a temperature of the supply airflow at a supply inlet of the ventilator, a second temperature sensor for determining a temperature of the supply airflow at a supply outlet of the ventilator, a third temperature sensor for determining a temperature of the exhaust airflow at an exhaust outlet of the ventilator and a controller for independently adjusting the fan speed for each of the first and second DC fans in response to input received from the first, second and third temperature sensors, the method comprising: at a preselected time, automatically determining a first thermal efficiency for the supply airflow using the supply inlet temperature and a second thermal efficiency for the exhaust airflow using the supply outlet temperature inputs; and adjusting the fan speed of the supply fan and/or the exhaust fan so as to substantially equalize the first thermal efficiency and the second thermal efficiency for the exhaust airflow.

Preferably, the supply fan speed is increased or the exhaust fan speed is decreased where the thermal efficiency for the supply airflow is greater than the thermal efficiency for the exhaust fan.

Preferably, the supply fan speed is decreased or the exhaust fan speed is increased where the thermal efficiency for the supply airflow is less than the thermal efficiency for the exhaust fan.

In accordance with another aspect of the present invention, there is provided a storage medium readable by a computer encoding a computer program for execution by the computer to carry out a method for optimizing ventilation efficiency of a ventilation system having a first direct current (DC) fan producing a supply airflow through a ventilator to an interior of a building, a second DC fan for producing an exhaust air flow of return air through a ventilator for exhausting to an exterior of the building, a first temperature sensor determining a temperature of the supply airflow upstream of the ventilator, a second temperature sensor determining a temperature of the supply airflow downstream of the ventilator, a third temperature sensor determining a temperature of the exhaust airflow downstream of the ventilator and a controller for independently adjusting the fan speed for each of the first and second DC fans in response to input received from the first, second and third temperature sensors, the computer program comprising: code means for determining a thermal efficiency for the supply airflow and the exhaust airflow from temperature data for the supply airflow and the exhaust airflow obtained from each of the first, second and third temperature sensors; code means for comparing the thermal efficiency for each of the supply airflow and the exhaust airflow with predetermined values; code means for determining whether the thermal efficiencies for supply and exhaust airflows are substantially equal to predetermined values; and code means for adjusting the fan speed of the first and/or the second fan where the thermal efficiencies of the supply airflow and/or the exhaust airflow are determined to be unequal.

In accordance with another aspect of the present invention, there is provided a storage medium readable by a computer encoding a computer program for execution by the computer to carry out a method for self-balancing a supply airflow and an exhaust airflow in a ventilation system, the ventilation system comprising a direct current (DC) supply fan for producing a supply airflow through a ventilator for circulation inside a building, a DC exhaust fan for producing an exhaust air flow of return air through a ventilator for exhausting outside of the building, a first temperature sensor for determining a temperature of the supply airflow at a supply inlet of the ventilator, a second temperature sensor for determining a temperature of the supply airflow at a supply outlet of the ventilator, a third temperature sensor for determining a temperature of the exhaust airflow at an exhaust outlet of the ventilator and a controller for independently adjusting the fan speed for each of the first and second DC fans in response to input received from the first, second and third temperature sensors, the computer program comprising: code means for determining a first thermal efficiency for the supply airflow using the supply inlet temperature and a second thermal efficiency for the exhaust airflow using the supply outlet temperature inputs; and code means for adjusting the fan speed of the supply fan and/or the exhaust fan so as to substantially equalize the first thermal efficiency and the second thermal efficiency for the exhaust airflow.

BRIEF DESCRIPTION OF THE DRAWINGS

The invention and the illustrated embodiments may be better understood, and the numerous objects, advantages, and features of the embodiment of the present invention and illustrated embodiments, may become apparent to those skilled in the art by reference to the accompanying drawings. In the drawings, like reference numerals refer to like parts throughout the various views of the non-limiting, non-exhaustive and exemplary embodiments of the present invention, and wherein.

DETAILED DESCRIPTION OF PREFERRED EMBODIMENTS

Figure 1:
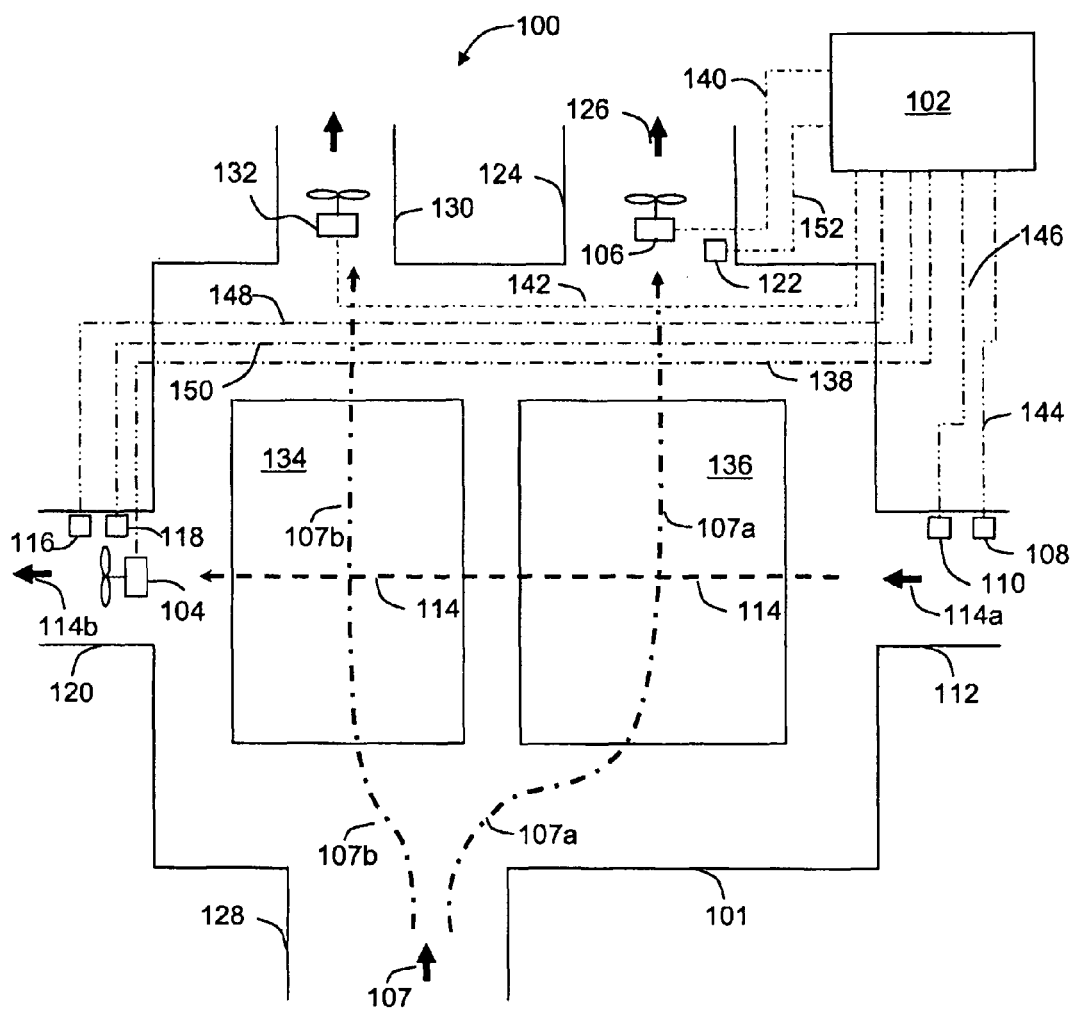
FIG. 1 is a schematic view of a ventilation system according to one embodiment of the present invention.

In accordance with one embodiment of the present invention, a first temperature sensor may be positioned in the supply airflow at a position proximate to a supply inlet of the ventilator. A second temperature sensor may be positioned in the supply airflow at a position proximate to a supply outlet of the ventilator. A third temperature sensor may be positioned in the exhaust airflow at a position proximate to the exhaust outlet of the ventilator. Optionally, a fourth temperature sensor may be positioned in the return airflow at a position proximate to the exhaust inlet of the ventilator.

An energy exchange core, such as a heat exchange core or an enthalpy exchange core, may also be provided where the supply airflow and the exhaust airflow do not mix in the ventilator. Alternatively, the airflows may mix in the ventilator in the absence of a core. Energy transfer may occur between the supply and exhaust airflows, with heat and/or moisture transferred therebetween.

A recirculation fan for drawing a portion of return air for recirculation inside of a building may also be provided.

Humidity sensors positioned in the supply airflow to determine a humidity property of supply air and of treated air may also be provided. The humidity sensors output a signal to the controller for use in optimizing the supply and exhaust airflows.

Fan speeds of one or more of the DC fans may be increased or decreased by up to 5%, up to 10%, up to 15% or up to 20% during an adjustment, in the process of balancing supply and exhaust airflows. Fan speeds of one or more of the DC fans may be increased or decreased, independently or collectively, by up to 5%, up to 10%, up to 15% or up to 20% during an adjustment, to adjusting a humidity property of the supply airflow.

The embodiment of the present invention overcomes the disadvantages of the prior art by providing a ventilation system having means for detecting and automatically correcting unbalanced air flows in and out of a building, including through fine control of fan speeds and allowing for runtime optimization of airflows. The embodiment of the present invention may further provide improvements to the energy efficiency of a ventilation system in terms of electricity consumption as well as improved ventilation effectiveness, and may also allow for a potential reduction in the cost to heat and to air condition a house.

One reason for the improved electrical efficiency of the described system is the use of DC fans. DC fans exhibit higher efficiency than AC fans, especially when used at variable speeds. An additional advantage is that a ventilation system using DC fans can be used much more easily in different regions. For example, a ventilation system meant to be powered by a North American 115V/60 Hz supply cannot be easily adapted to a European 220V/50 Hz network. Adapting a DC-based system to a different mains voltage often involves simply toggling a switch on the DC power supply. In addition, the ventilation system can also be used easily and efficiently when it is not connected to the power distribution grid. For example, the ventilation system can be used with alternative sources of energy, including solar panels, windmills or batteries.

The fine control of fan speeds also contributes to the improved energy efficiency. With conventional ventilation systems, fan speeds are generally limited to "low", "medium" and "high" settings. In a given situation where an airflow greater than that provided by the "medium" settings is required, the airflow provided by the high setting may be excessive. In this situation, the higher fan speed must be used to ensure an acceptable air quality. This results in increased energy consumption and therefore, reduced energy efficiency. Fine speed control allows for the lowest energy consumption while attaining the required ventilation rate.

Fine speed control is accomplished with DC fans using pulse width modulation (PWM). It is especially useful when seeking to establish balanced exhaust and supply airflows. In systems with a limited number of discrete speed settings, it is less likely that the fans can be adjusted in such a way as to substantially equalize the airflows.

The disclosed apparatus also allows the ventilation system to minimize ventilation rates without compromising air quality thereby reducing its consumption of electricity. In addition, the system is able to optimize the transfer of sensible energy, based on input from sensors located in the supply airflow. The transfer of latent energy may also be optimized based on the detected humidity levels in certain embodiments. The disclosed device also provides automatic, controlled balancing of the exhaust and supply airflows.

A control circuit receives inputs from the temperature and optional humidity sensors located in the incoming supply airflow, to measure the properties of the outdoors air, and in the outgoing supply airflow, to measure the properties of the treated air. This data is used to determine the flow rates necessary to maximize the effectiveness of the ventilation system, and the duty cycles of the PWM signals for each fan.

The automatic balancing of the supply and exhaust airflows by the controller prevents the creation of a negative or positive pressure in the structure. In the winter especially, a positive pressure is undesirable since it leads to increased energy usage for heating. Therefore, a mechanism for ensuring balanced airflows increases not only the ventilation effectiveness of the system, but may also lower the operating costs of a building's heating system.

Likewise, in the summer, a negative pressure is undesirable because it can cause infiltration of hot air and moisture. This causes an increased utilization of air conditioning or dehumidification systems, resulting in increased electricity costs. Balanced airflows may therefore result in lower electricity usage and lower operating costs of a building's heating, ventilation and air condition systems during the entire year.

There is also a sensor to measure the temperature of the exhaust airflow. This sensor is used in conjunction with the two temperature sensors described above to determine whether the exhaust and supply airflows are balanced. If they are not, the fan speeds are adjusted in order to equalize the two air flows. If three fans are present, including for example a recirculation fan, the third recirculation fan may be either temporarily deactivated or taken into account during efficiency calculations in order to obtain accurate results.

One method of determining whether the supply and exhaust airflows are balanced, is to calculate the thermal efficiency of the system. The thermal efficiencies when calculated from the supply outlet and when calculated from the exhaust outlet are equal to the efficiencies determined during product testing when the two airflows are balanced.

Reference will now be made in detail to some specific embodiments of the invention including the presently preferred embodiments for carrying out the invention. Examples of these specific embodiments are illustrated in the accompanying drawings. While the invention is described in conjunction with these specific embodiments, it will be understood that it is not intended to limit the invention to the described embodiments. On the contrary, alternatives, modifications, and equivalents within the spirit and scope of the invention are intended to be included.

In the following description, specific details are set forth in order to further provide an understanding of the present invention and the variations, modifications and alternatives within its scope. The embodiment of the present invention may be made or practiced without some or all of these specific details. In other instances, well known process operations or constructions have not been described in detail in order to avoid unnecessarily obscuring the understanding of the present invention.

In this specification and the appended claims, the singular forms "a", "an" and "the" include plural reference unless the context clearly dictates otherwise. Unless defined otherwise, all technical and scientific terms used herein have the same meaning as commonly understood to one of ordinary skill in the art to which this invention pertains.

The term "duct" is intended to include any conduit, passage, pipe, tube or other elongated hollow body capable of carrying air. A duct may be formed by any type of suitable duct material, for example but not limited to, sheet metal, plastic, or the like.

The term "fan" is intended to include any instrument or device for producing a current of air, for example but not limited to, any device that comprises a series of vanes radiating from a hub rotated on its axle by a motor.

The term "airflow" is intended to describe the direction of the air movement, for example, from within a ventilator from an inlet of air supply to an outlet.

The term "cross flow" is intended to describe the directions of air flows are substantially perpendicular to each other. However, it should be apparent to a person skilled in the art that the air flows of the embodiment of the present invention are not limited to form a cross-flow. Other examples with various degrees of efficiency may include, but not limited to, counter flow, parallel flow, or any other arrangement.

The term "building" is intended to describe structures, constructs, or the like, or parts thereof, in which ventilation systems of the embodiment of the present invention may be usefully employed. It should be apparent to persons of skill in the art that such buildings may include enclosures, rooms, sheds, cabins, complexes, or the like.

Referring to FIG. 1, there is schematically illustrated an embodiment of a ventilation system 100 with a ventilator enclosure 101 having two energy exchange cores and using three temperature sensors. The positioning of the fans and the temperature sensors within the ventilator enclosure is also depicted.

An electronic controller 102, receives and processes input signals via circuits (depicted in FIG. 1 by broken lines). Two direct current (DC) fans are present: a supply fan 104 to draw fresh air from the exterior into the building and another exhaust fan 106 to expel the return air 107 from the building to the exterior. A temperature sensor 108 and a humidity sensor 110 are located at the inlet of the exterior supply duct 112 in the supply airflow 114. It should be appreciated that the temperature sensor 108 and the humidity sensor 110 may be located at many possible locations upstream of the energy exchange in the supply airflow 114, for example but not limited to, upstream of the exchange cores described later. A second temperature sensor 116 and a second humidity sensor 118 are located at the outlet of the building supply duct 120 in the supply airflow 114. Similarly, it should be appreciated that the second temperature sensor 116 and the second humidity sensor 118 may be located at many possible locations downstream of the energy exchange in the supply airflow 114, for example but not limited to, downstream of the exchange cores described later. A third temperature sensor 122 is located at the outlet of the exhaust duct 124 in the exhaust airflow 126. Likewise, it should be appreciated that the third temperature sensor 122 may be located at many possible locations upstream of the energy exchange in the exhaust airflow 126.

The exterior supply duct 112 typically communicates with the ventilator enclosure 101 at the supply inlet and provides a conduit by which fresh air from the exterior of the building may by drawn into the ventilator enclosure 101. The building supply duct 120 communicates with the ventilator enclosure 101 at the outlet of the building supply duct 120 and provides a conduit by which fresh air from the supply air flow 114 may be conveyed from the ventilator enclosure 101 to the interior of the building. It can be appreciated that the length and type of the air ducts leading to and from the ventilator enclosure may be different. In certain embodiments, a truncated duct may be used depending on where in the building the fresh air is to be conveyed. In other embodiments, a complex duct system may be required.

The exhaust duct 124 communicates with the ventilator enclosure 101 at an exhaust outlet and provides a conduit by which return air 107 from the interior of the building may be supplied to the exterior of the building. A return air duct 128 communicates with the ventilator enclosure at an exhaust inlet to convey return air 107 from the interior of the building into the ventilator enclosure 101. It can be appreciated that, in certain embodiments, a fully defined duct may be unnecessary, depending on where from the interior of the building the return air is to be drawn. In other embodiments, a complex duct system may connect to and communicate with the return air duct 128.

Optionally, a recirculation duct 130 may be provided communicating with the ventilator enclosure 101 at a recirculation outlet and provide a conduit by which a portion of the return air 107 may be passed through the ventilator enclosure 101 and recirculated into the interior of the building. An optional, third recirculation fan 132 can be present to produce airflow through the recirculation duct, which may be termed a recirculation airflow.

Optionally, an additional temperature sensor (not shown in FIG. 1) may be located at the exhaust inlet to the ventilator enclosure and in the return air 107 coming from the interior the building proximate to the exhaust inlet if increased precision is required.

The illustration presented in FIG. 1 also depicts two energy transfer cores 134 and 136. The energy transfer core may be a heat-exchange core where heat is transferred from one airflow to another. Alternatively, the energy transfer core may be an enthalpy core where both heat and moisture are exchanged from one airflow to another.

For example, a heat exchange core 136 forming a crossflow, air-to-air type of heat exchanger may be provided. Such heat exchange core 136 may allow heat to be exchanged between a first airflow flowing in a first path, for example, in the horizontal direction such as indicated by airflow 114 in FIG. 1; and a second airflow flowing in a second path, for example, the quasi-vertical direction such as indicated by the airflow 107, 107*a*. The heat exchange core 136 may by configured to allow heat to be exchanged between the two airflows with or without mixing. Further, moisture barrier sheets may be used to prevent the transfer of moisture between the two airflows.

As another example, an enthalpy exchange core 134 forming a cross-flow, air-to-air type of exchanger may also be provided. Such an enthalpy exchange core allows heat and moisture to be exchanged between a first airflow flowing in a first path, for example, the horizontal direction as such indicated by the airflow 114 in FIG. 1; and a second airflow flowing in a second path, for example, the quasi-vertical direction such as indicated by the airflow 107, 107*b* in FIG. 1. The enthalpy exchange core may by configured to allow heat and moisture to be exchanged between the two airflows with or without mixing.

It should be evident to a person skilled in the art that the invention may assume other forms. As an example, the embodiment presented in FIG. 1 depicts a cross-flow. Parallel flow or counter-flow, for instance, could be substituted without changing the nature of the invention.

Further, the precise type of core or its construction does not affect the embodiments of the present invention. They are included for illustrative purposes only to facilitate an understanding as to the scope of the invention.

FIG. 1 further depicts the movement of air through the support structure. The supply airflow 114, being the flow of fresh air 114*a* from the exterior of the building through the exterior supply duct 112 through the ventilator enclosure 101 and on through into 114*b* the interior of the building through the building supply duct 120, is controlled by the supply fan 104. The supply fan 104 is mounted in communication with the building supply duct 120. The fan speed is regulated by the controller to control the precise rate of supply airflow 114.

The exhaust airflow 107, being the flow of return air drawn from the interior of the building through the return air duct 128 through the ventilator enclosure 101 for exhausting through the exhaust duct 124 to the exterior of the building, is controlled by the exhaust fan 106. The exhaust fan 106 is mounted in communication with the exhaust duct 124. The fan speed is also by the controller to control the precise rate of exhaust airflow 107.

The optional third fan 132, which may also be a DC fan, is mounted in communication with the recirculation duct 130, to produce a recirculation air flow 107*b*. Recirculation fan 132 causes a portion of the return air to be recirculated back into the interior of the building.

In FIG. 1, the exhaust airflow 107 with the direction and general path of airflow in circumstances where both exhaust fan 106 and recirculation fan 132 are operating is depicted in bolded dotted lines. When exhaust fan 106 is in operation, a portion of return air entering at return air duct 128 passes through heat exchange core 136 and is exhausted to the exterior of the building. When recirculation fan 132 is in operation, a portion of the return air entering at return air duct 128 to flow through core 134 and into recirculation duct 130 for recirculation back into the interior of the building.

It can be appreciated that increasing or decreasing the fan speed correspondingly increases or decreases the rate of the respective airflow. The operation of the fans 104, 106 and 132, which are driven by DC motors, is controlled by the controller 102. For example, but not limited to, increasing the fan speed of supply fan 104 may increase the uptake of fresh outside air into the building and increase the rate of supply airflow 114 through cores 136 and 134.

The amount of return air exhausted from the building may be more or less than that recirculated into the building, having regard to the respective fan speeds of the exhaust fan 106 and the recirculation fan 132. For example, increasing the fan speed of the exhaust fan 106 without increasing the fan speed of the recirculation fan 132 may result in more return air being exhausted from the building. Similarly, having relatively lower fan speeds the exhaust fan 106 may increase the pressure in the building.

With further reference to FIG. 1, the supply airflow 114, having flowed through energy transfer cores 134 and 136, may have had heat and/or moisture added thereto, or extracted therefrom, from the cross-flow of exhaust air. Such supply air downstream of the cores may be termed treated air and be conveyed to areas in the interior of the building via building supply duct 120.

Fans 104, 106, and 132 are each connected to the controller 102 via circuits 138, 140, and 142, respectively. Temperature sensor 108 and humidity sensor 110 are connected to the controller 102 via circuits 144 and 146. Temperature sensor 116 and humidity sensor 118 are connected to the controller 102 via circuits 148 and 150. Temperature sensor 122 is connected to the controller 102 via circuit 152.

The control of the DC fan speed can be accomplished, for example, through the use of field effect transistors (FETs), although other types could be substituted. The supply voltage to the fan may be controlled by pulse width modulation (PWM) through signals sent from a microcontroller. As would be apparent to one of skill in the art, the utilization of PWM in this example would allow for a large range of fan speeds, and permitting fine control of fan speeds.

As will be described later, based on the temperature data received from the sensors, it can be determined whether the supply and exhaust airflows are balanced by calculating the thermal efficiencies of the two airflows. When the two airflows are balanced, the thermal efficiencies of the ventilation system, for example, but not limited, to the efficiency for the supply airflow and the efficiency for the exhaust airflow, will be equal to their predetermined values when calculated using the temperature of the supply airflow and the temperature of the exhaust airflow. If it is found that the two airflows are unbalanced, the duty cycles of the two (or more) fans 104 and 106 can be adjusted through PWM accordingly, increasing or decreasing the fan speed, and thus the air flow rates, in order to balance the supply and exhaust airflows.

In one exemplary embodiment, the efficiency for the supply airflow and the efficiency for the exhaust airflow may be calculated as:

Supply Efficiency=abs((InsideTemp−OutsideTemp)/(EstimatedRoomTemperature−OutsideTemp));

Exhaust Efficiency=abs((ExhaustTemp−EstimatedRoomTemperature)/(OutsideTemp−EstimatedRoomTemperature));

wherein abs( ) is the absolute value, EstimatedRoomTemperature may be set when the unit is programmed, for example but not limited to, set to 20° C.

In the embodiment where a fourth temperature sensor (as described below) is present, the temperature reading from the sensor can be used instead of the EstimatedRoomTemperature.

While the controller 102 is balancing the ventilation system, by calculating the thermal efficiency of the ventilation system, the recirculation fan 132 may be halted or otherwise taken into consideration in the efficiency calculations, so as to allow an accurate calculation of the efficiency.

The humidity sensors 110 and 118 measures the humidity of the supply airflow 114 before and after passage through cores 136 and 134. Information from humidity sensors 110 and 118 in conjunction with information from temperature sensors 108 and 116 may also be used by the controller 102. Thus, the controller receives input from the temperature sensor 108 and/or the humidity sensor 110 located in the incoming supply airflow to measure the properties of the incoming supply airflow 114a, and from the temperature sensor 116 and/or the humidity sensor 118 located in the outgoing supply airflow 114b to measure the properties of the treated air. This data is used to determine the flow rates necessary to maximize the effectiveness of the ventilation system, and the duty cycles of the PWM signals for each fan.

Figure 2:
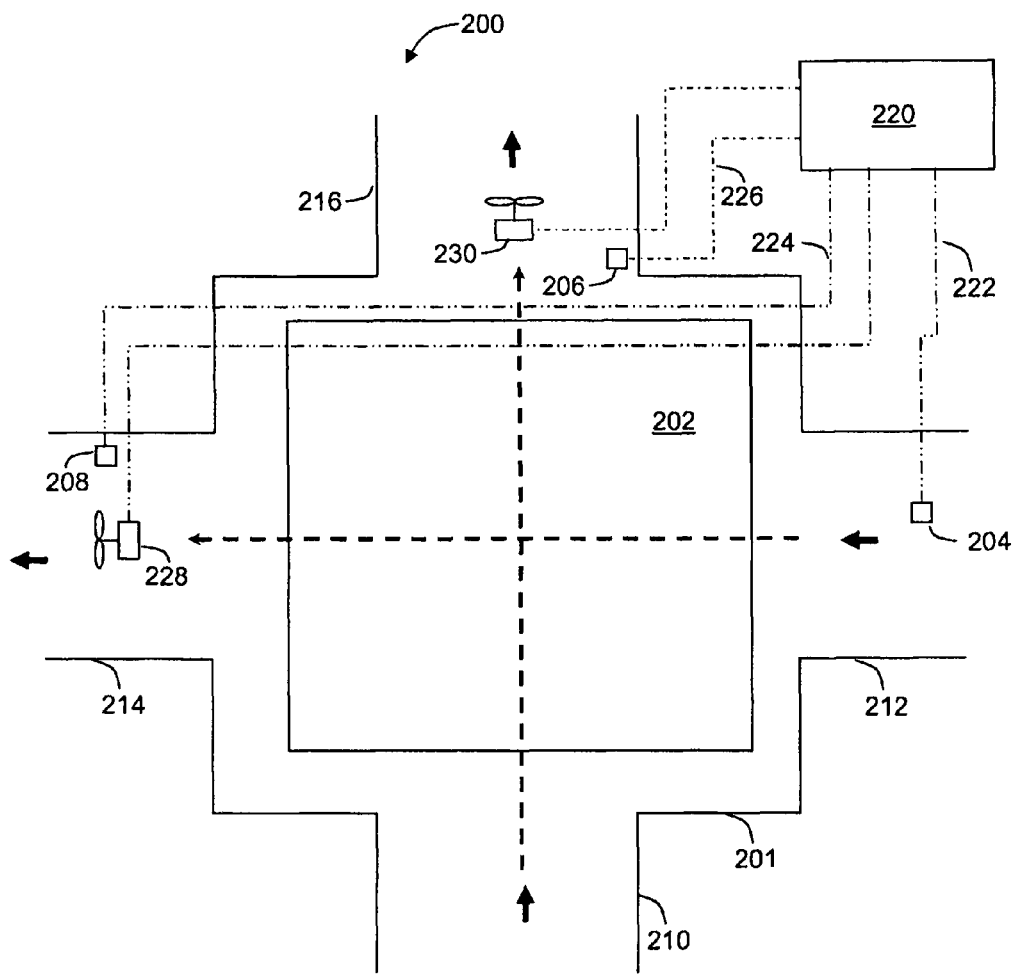
FIG. 2 is a schematic view of a ventilation system according to another embodiment of the present invention.

FIG. 2 presents another possible embodiment of a ventilation system 200 with a ventilator enclosure 201, containing a single core 202, such as a heat recovery ventilator, with three temperature sensors.

In FIG. 2, three temperature sensors 204, 206 and 208 are present, though a fourth temperature sensor (not shown), for increased accuracy, may be located at the exhaust inlet and used to measure the temperature of the exhaust airflow entering through duct 212 before passing through the core 202. Temperature sensor 204 measures the temperature of the airflow passing through the supply duct 212, while temperature sensor 208 measures the temperature of the treated air entering the structure through the building supply duct 214, and temperature sensor 206 measures the temperature of the exhaust air passing through the exhaust duct 216. Temperature sensors 204, 206, and 208 are connected to the controller 220 via circuits 222, 224, and 226 respectively. The information from these sensors is used by the controller 220 to optimize the performance of the ventilation system, including by adjusting fan speeds of supply fan 228 and exhaust fan 230 as necessary. For the purposes of optimization, the return air entering the ventilation system to be exhausted at the exhaust inlet is assumed to be at 20° C.

Figure 3:
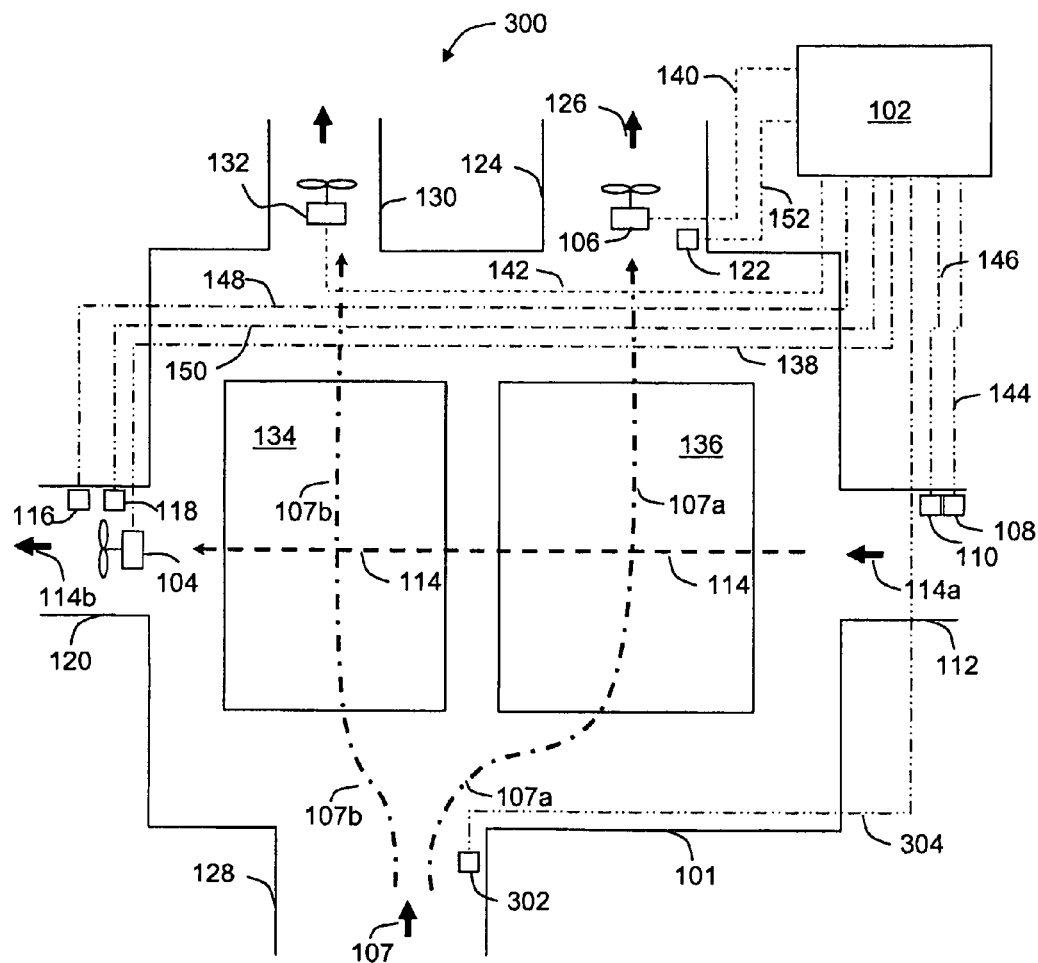
FIG. 3 is a schematic view of a ventilation system according to another embodiment of the present invention.

FIG. 3 shows another embodiment of a ventilation system 300 with a ventilator enclosure 101 having two energy exchange cores and four temperature sensors 108, 116, 122 and 302 for increased accuracy. This embodiment is substantially similar to the ventilation system 100 described in FIG. 1. The additional temperature sensor 302 measures the temperature of the return air entering the ventilator enclosure 101. As described in the above, the reading from the additional temperature sensor 302 may be used to provide an accurate reading of the temperature of the return air, for calculating both the efficiency for the supply airflow and the efficiency for the exhaust airflow.

Temperature sensors 108, 116, 122 and 302 are connected to the controller 102 via circuits 144, 148, 152 and 304 respectively. The information from these temperature sensors is used by the controller 102 to optimize the performance of the ventilation system, including by adjusting fan speeds of fans 104 and 106.

As depicted in FIG. 3, humidity sensors 110 and 118 are electrically connected to the controller 102 via circuits 146 and 150 respectively. Humidity sensors 110 and 118 measure humidity of the fresh airflow before and after passage through energy exchange cores 136 and 134. In conjunction with temperature sensors 110 and 116, the information from these temperature and humidity sensors may be used by the controller 102 to further optimize the performance of the ventilation system, including humidity levels, by adjusting fan speeds of fans 104 and 106 via control signals transmitted through circuits 138 and 140 respectively.

Figure 4:
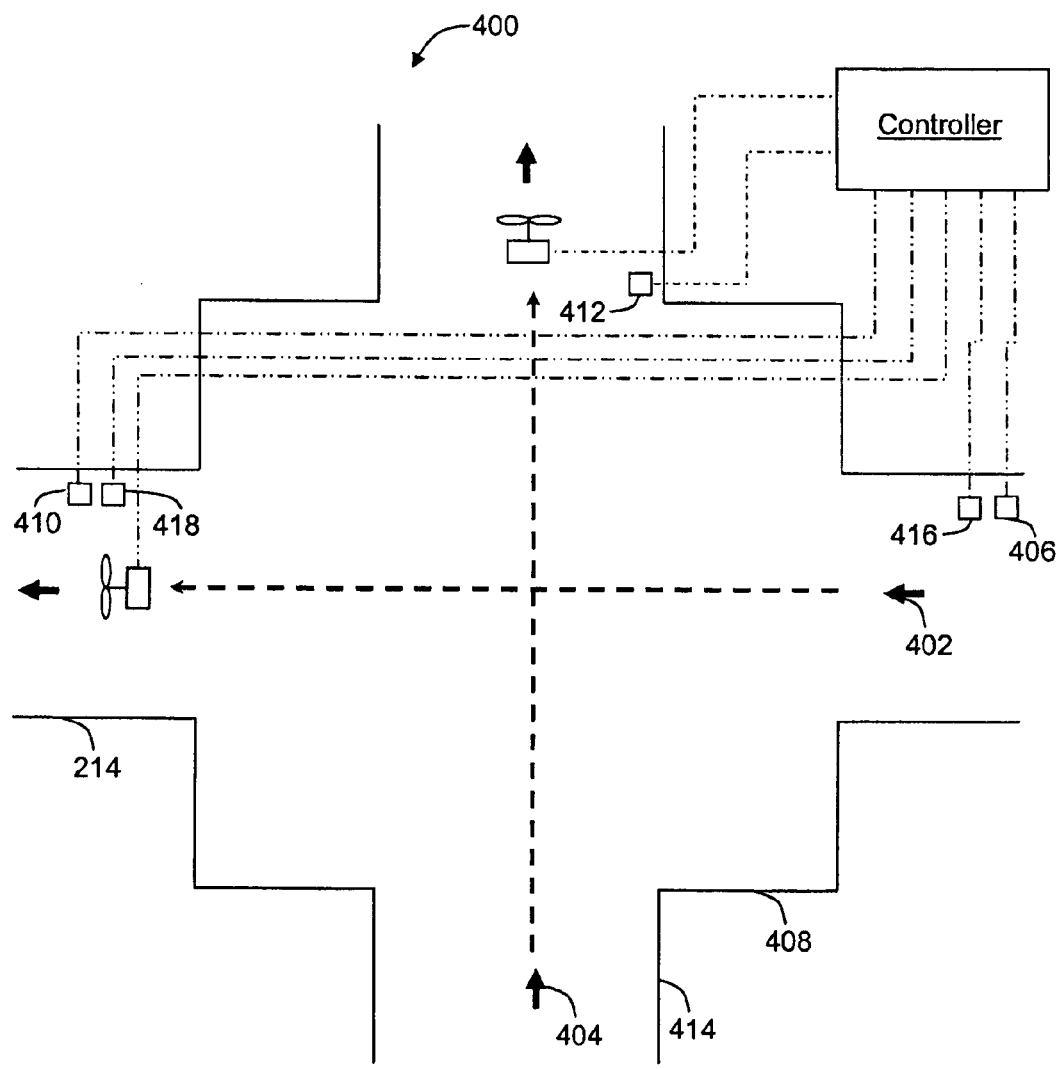
FIG. 4 is a schematic view of a ventilation system according to another embodiment of the present invention.

FIG. 4 is an illustration of a simple air-mixing ventilation system 400 that mixes the fresh airflow 402 and exhaust airflow 404. Temperature sensor 406 measures the temperature of the fresh air entering the ventilator enclosure 408. Temperature sensor 410 measures the temperature of the treated air to be supplied to the interior of the building. Temperature sensor 412 measures the temperature of the air to be exhausted to the exterior. In this embodiment, the temperature of the air entering through duct 414 may be assumed to be approximately 20° C. Humidity sensors 416 and 418 are also present, measuring the humidity of the supply airflow 402 before and after mixing with the exhaust airflow 404.

Figure 5:
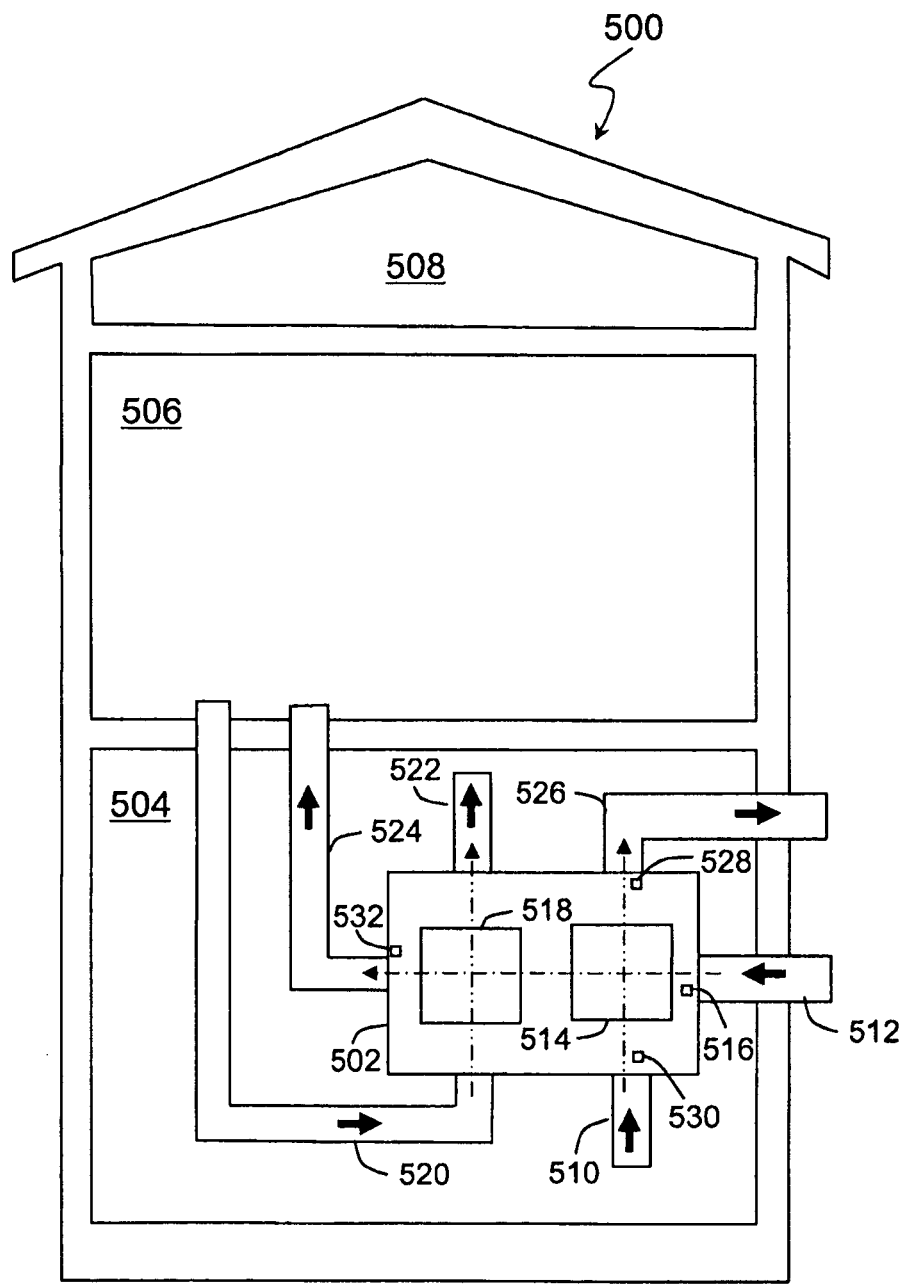
FIG. 5 is a schematic view of a ventilation system similar to the embodiment of FIG. 1, installed in a two level house.

FIG. 5 illustrates a possible installation of an embodiment of a ventilation system 502 within a two level house 500. The house 500 includes a ground floor level 504, a second floor 506 and an attic 508. It can be appreciated that many variations are possible, for example, but not limited to, the ground floor 504 may alternatively be completely or partially below grade, for example, but not limited to, a basement, crawl space or a cellar, and the second floor 506 may be at or above ground level. The first floor 504 may generally have a lower temperature while the second floor 506 having a higher temperature.

Fresh air is drawn from the exterior, through supply duct 512, while return air is exhausted through exhaust duct 526. Inside the ventilation system 502, there are two energy exchange cores 514 and 518. Return air is drawn into the ventilation system through return air duct 510, and heat and/or moisture is exchanged with the fresh air drawn through supply duct 512 in core 514. The temperature of the return air in duct 512 may be assumed to be 20° C. in this case, while the temperature of the fresh air is measured by temperature sensor 516. There may be a second core 518, which exchanges heat and/or moisture between the treated air leaving the core 514 and return air drawn through duct 520 to be recirculated to the floor area 504 through duct 522. The treated air is then sent to the upper level 506 through duct 524. The temperature of the return air to be exhausted outside through exhaust duct 526 is measured by temperature sensor 528. This data is fed to the controller (not shown) and is used to optimize the performance of the ventilation system. During the balancing process, the airflow drawn through return air duct 510 and expelled through duct 522 may be reduced to zero, to allow for accurate readings.

Optionally, the temperature of the return air drawn into the ventilation system 502 through duct 510 is measured by sensor 530, and the temperature of the air to be sent through duct 524 is measured by sensor 532. The temperature data is once again used by the controller to optimize the ventilation efficiency of the system.

A single core ventilation system could also be used, without changing the nature of the invention.

FIGS. 6A to 6F shows an exemplary method for utilizing humidity sensors and temperature sensors to control the fans in a ventilation system in accordance with an embodiment of the present invention. Also referring to FIG. 1, the steps of this exemplary method will be described below.

A desired humidity level is set 602, and one of a plurality of operating settings, for example but not limited to, three, is selected 604 depending on, for example, but not limited to, the floor area of the building and the number of bedrooms. The setting may be selected based on the following table:

| Floor area (ft²) | Bedrooms | | | | | | | | | |
|---|---|---|---|---|---|---|---|---|---|---|
| | 0-1 | | 2-3 | | 4-5 | | 5-6 | | 6-7 | |
| <1500 | 30 | Setting 1 | 45 | Setting 1 | 60 | Setting 1 | 75 | Setting 1 | 90 | Setting 2 |
| 1501-3000 | 45 | Setting 1 | 60 | Setting 1 | 75 | Setting 1 | 90 | Setting 2 | 105 | Setting 3 |
| 3001-4500 | 60 | Setting 1 | | Setting 1 | 90 | Setting 2 | 105 | Setting 3 | 120 | Setting 3 |
| 4501-6000 | 75 | Setting 1 | 90 | Setting 2 | 105 | Setting 3 | 120 | Setting 3 | 135 | |
| 6001-7500 | 90 | Setting 2 | 105 | Setting 3 | 120 | Setting 3 | 135 | | 150 | |
| >7500 | 105 | Setting 3 | 120 | Setting 3 | 135 | | 150 | | 165 | |

The numbers besides the Settings are examples of CFM values that may be required in the given situation. For example, for a house between 1501 and 3000 square feet, with one bedroom the amount of needs to be re-circulated is about 45 CFM. It should be apparent to a person skilled in the art that these requirements will vary depending on regional or national building codes.

Each of the settings would correspond to a nominal speed. So for example, but not limited to, for Setting 1 the DC motor is initially running at the nominal speed $S_{N1}$. In accordance with one embodiment of the present invention, as described below, the DC motors allow a fine control of the fan speed to balance the supply airflow and the exhaust airflow.

The supply fan 104 at the building supply duct 120 which generates the supply airflow 114 from the exterior of the building into the interior of the building, and the exhaust fan 106, which expels the return air 107 from the building to the exterior, operate at the chosen speed and the recirculation fan 132 is activated 606. A timer, set to determine when to perform a self-balancing test, is checked 610. When the timer has expired 612, then the self-balancing process begins at 614. Otherwise 616, if the measured humidity in the interior of the building is below the set desired level 618, then the temperature of the incoming supply airflow 114a $T_{IN}$ will be further considered 620. If the measured humidity inside the building is above the set desired level 622, the temperature sensor 108 and humidity sensor 110 at the supply duct 112 are read and the dew point of the incoming supply airflow 114a $DP_{IN}$ is calculated 624. If the measured temperature of the incoming $T_{IN}$ of the supply airflow 114a is less than a predetermined minimum temperature $T_{MIN}$, for example, but not limited to, $-10°$ C., 626, then the device enters into a defrost cycle, as frost may build up in the energy core of the ventilation system during the lower temperature.

During the defrost cycle, the recirculation fan 132 is deactivated 628 and the supply fan 104 and exhaust fan 106 are run in a minimum air quality maintenance mode 630 632. The fan speed during the maintenance mode may be equal to, or different than the nominal speed. When the temperature rises above the predetermined minimum temperature $T_{MIN}$, for example, but not limited to, $-10°$ C., 634, the recirculation fan 132 is reactivated 636.

At the end of this defrost cycle, or if entering into the defrost cycle was not necessary 638, then the temperature of the outgoing supply airflow 114b $T_{OUT}$ and the humidity are read 640 from the temperature sensor 116 and humidity sensor 118 at the building supply duct 120. The dew point of the outgoing supply airflow 114b $DP_{OUT}$ is calculated 640. During the next steps 642, among other factors, the temperature of the incoming supply airflow $T_{IN}$ will be considered.

Figure 6A:
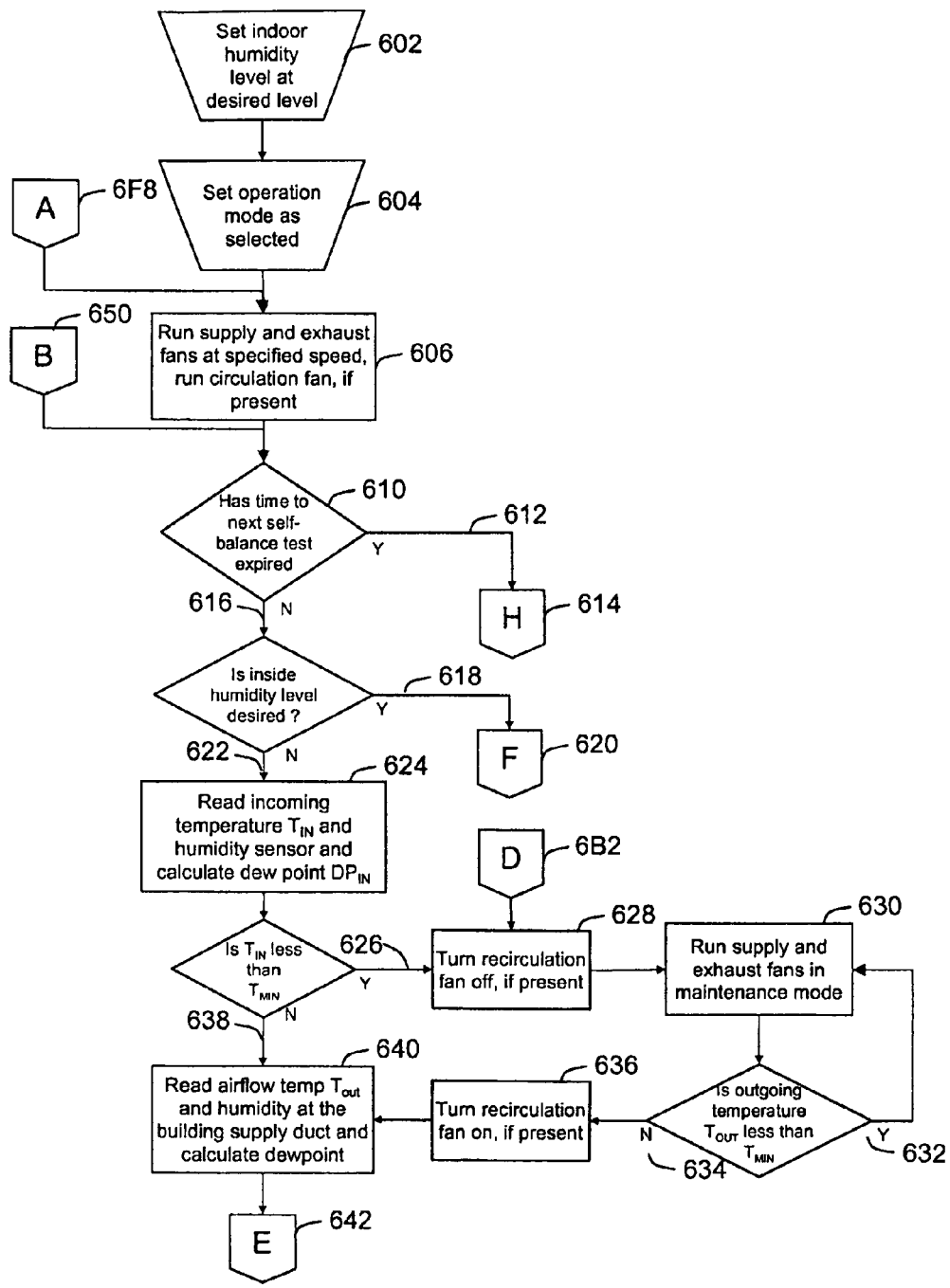
FIGS. 6A-6F are flow charts depicting controlling of the ventilation system according to an embodiment of the present invention.
Figure 6B:
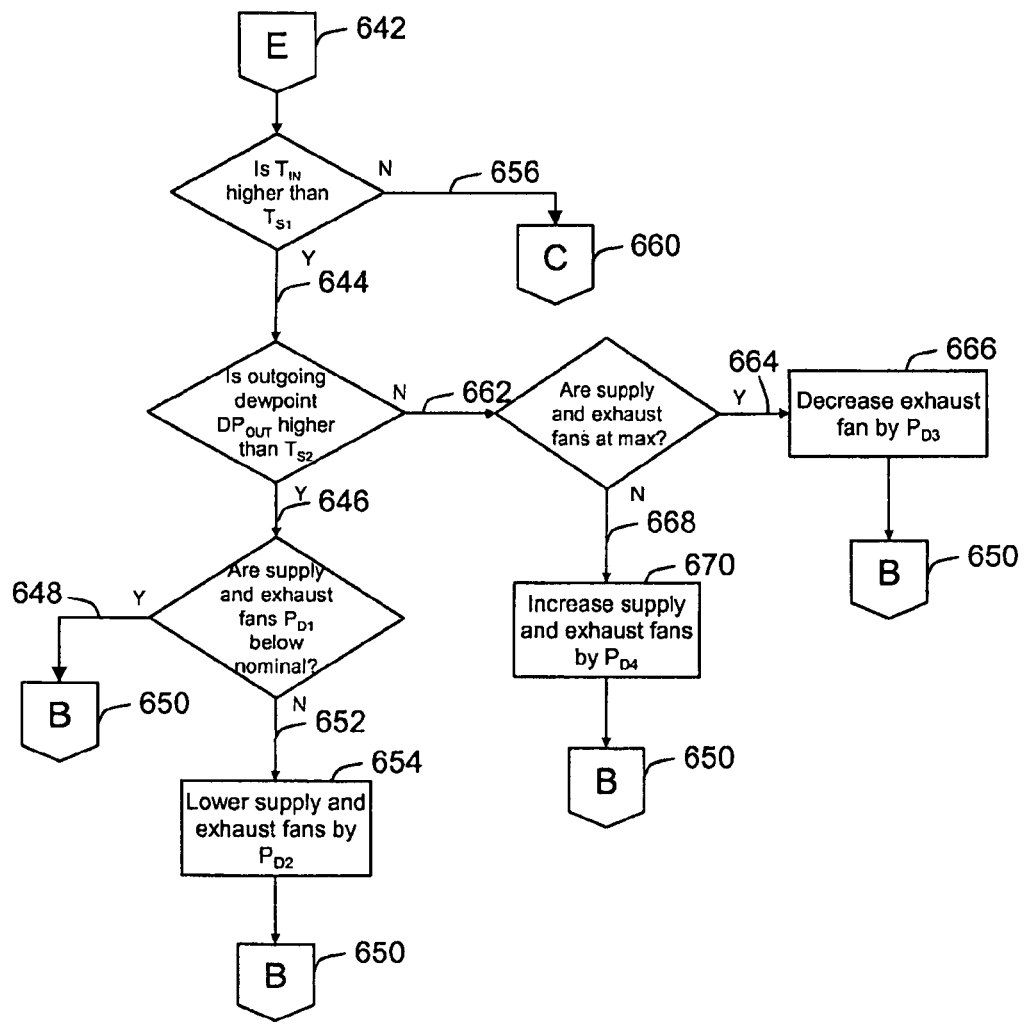

Continuing with reference to FIG. 6B, if the temperature of the incoming supply airflow 114a $T_{IN}$ is above a first preset threshold $T_{S1}$, for example, but not limited to, $10°$ C., 644, the dew point of the outgoing supply airflow 114b $DP_{OUT}$ will be checked to determine whether $DP_{OUT}$ is above a second preset threshold $T_{S2}$, for example, but not limited to, $11°$ C. If $DP_{OUT}$ is above the second preset threshold $T_{S2}$, for example, but not limited to, $11°$ C., 646, it will be determined whether the exhaust fan 106 and the supply fan 104 are operating below their nominal speed, by a first predetermined amount $P_{D1}$, for example, but not limited to, 15%, if yes 648, the ventilation system will continue to check the self-balance timer 650. If the exhaust fan 106 and the supply fan 104 are not operating 652 at least below their respective nominal speeds which correspond to the settings selected at 604, by the first predetermined amount $P_{D1}$, for example, but not limited to, 15%, then the speed of the exhaust fan 106 and the supply fan 104 will be lowered by a second predetermined amount $P_{D2}$, for example, but not limited to, 5%, 654, before continuing to check the self-balance timer 650.

If the temperature of the incoming supply airflow 114a $T_{IN}$ is below the first preset threshold $T_{S1}$, for example, but not limited to, $10°$ C., 656, then the dew point of the outgoing supply airflow 114b $DP_{OUT}$ will be determined.

When the temperature of the incoming supply airflow 114a $T_{IN}$ is higher than the first preset threshold $T_{S1}$, for example, but not limited to, $10°$ C., 644 and the dew point of the outgoing supply airflow 114b $DP_{OUT}$ is lower than the second preset threshold $T_{S2}$, for example, but not limited to, $11°$ C., 662, the speed of the exhaust fan 106 and the supply fan 104 will be checked to see whether it is at maximum. If the fans are operating at maximum speed 664, the speed of the exhaust fan 106 will be decreased by a third predetermined amount $P_{D3}$, for example, but not limited to, 10%, 666, before continuing to check the self-balance timer 650. After reaching maximum speed, it may be desirable to change one fan speed at a time to see what effect the change will have on the ventilation system. If the fans are not operating at maximum speed 668, the speed of the exhaust fan 106 and the supply fan 104 will be increased by a fourth predetermined amount $P_{D4}$, for example, but not limited to, 5%, 670, before continuing to check the self-balance timer 650.

Figure 6C:
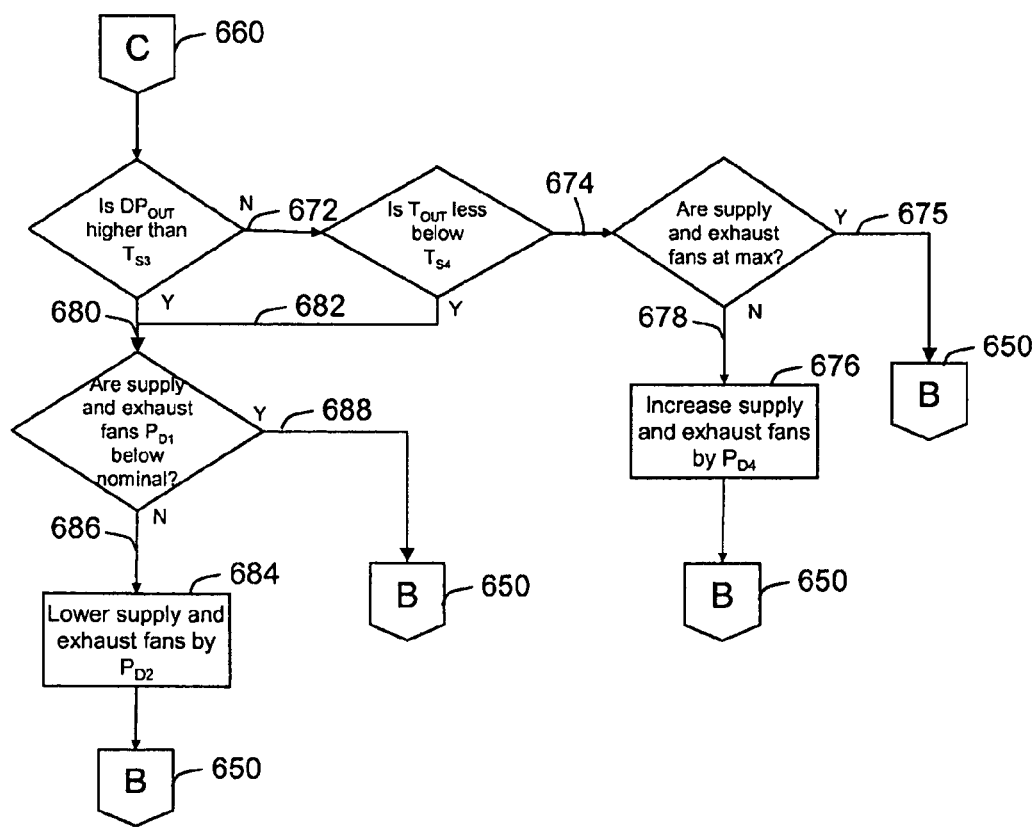

The steps of controlling the ventilation system when the temperature of the incoming supply airflow 114a $T_{IN}$ is between −10° C. and 10° C. are shown in FIG. 6C. If the dew point of the outgoing supply airflow 114b $DP_{OUT}$ is below a third preset threshold $T_{S3}$, for example, but not limited to, 8° C., 672, and the temperature of the outgoing supply airflow 114b $T_{OUT}$ is above a fourth preset threshold $T_{S4}$, for example, but not limited to, 14° C., 674, then the ventilation system will continue 675 to check the self-balance timer 650, after increasing the speed of the exhaust and supply fans by the fourth predetermined amount $P_{D4}$, for example, but not limited to, 5% 676, if they were not already at their maximum speeds 678. However, if the dew point of the outgoing supply airflow 114b $DP_{OUT}$ is above the third preset threshold $T_{S3}$, for example, but not limited to, 8° C., 680, or if the temperature of the outgoing supply airflow 114b $DP_{OUT}$ is below the fourth preset threshold $T_{S4}$, for example, but not limited to, 14° C., 682, then the speeds of the exhaust fan 106 and the supply fan 104 will be decreased by the second predetermined amount $P_{D2}$, for example, but not limited to, 5%, 684, if the exhaust fan 106 and the supply fan 104 were not already below their respective nominal speeds, which correspond to the settings selected at 604, by the first predetermined amount $P_{D1}$, for example, but not limited to, 15%, 686, before continuing 684 to check the self-balance timer 650.

Figure 6D:
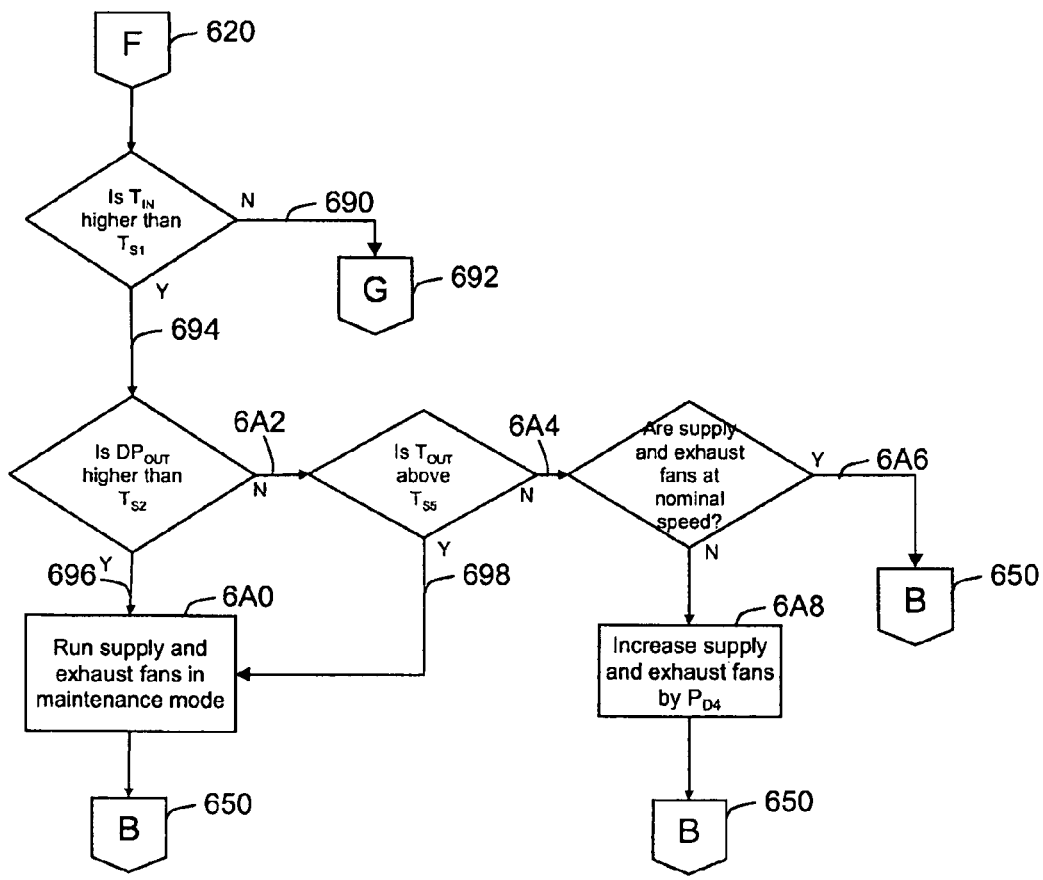

As shown in FIG. 6D, when the relative humidity measured is below the desired level and the temperature of the incoming supply airflow 114a $T_{IN}$ is below the first preset threshold $T_{S1}$, for example, but not limited to, 10° C., 690, then the process continues at 692. Otherwise 694, if the dew point of the outgoing supply airflow 114b $DP_{OUT}$ is above the second preset threshold $T_{S2}$, for example, but not limited to, 11° C., 696, or if the temperature of the outgoing supply airflow 114b $T_{OUT}$ is above the fifth preset threshold $T_{S5}$, for example, but not limited to, 29° C. 698, then the exhaust fan 106 and the supply fan 104 are set in maintenance mode 6A0 before continuing to check the self-balance timer 650. If, however, the dew point of the outgoing supply airflow 114b $DP_{OUT}$ is below the second preset threshold $T_{S2}$, for example, but not limited to, 11° C., 6A2 and the temperature is below the fifth preset threshold $T_{S5}$, for example, but not limited to, 29° C., 6A4, then the ventilation system will continue to check the self-balance timer 650 without change in fan speed if the exhaust fan 106 and the supply fan 104 are running at the respective nominal speeds, which correspond to the selected settings 6A6, or with an increase in speed of 5% 6A8 if they are not.

Figure 6E:
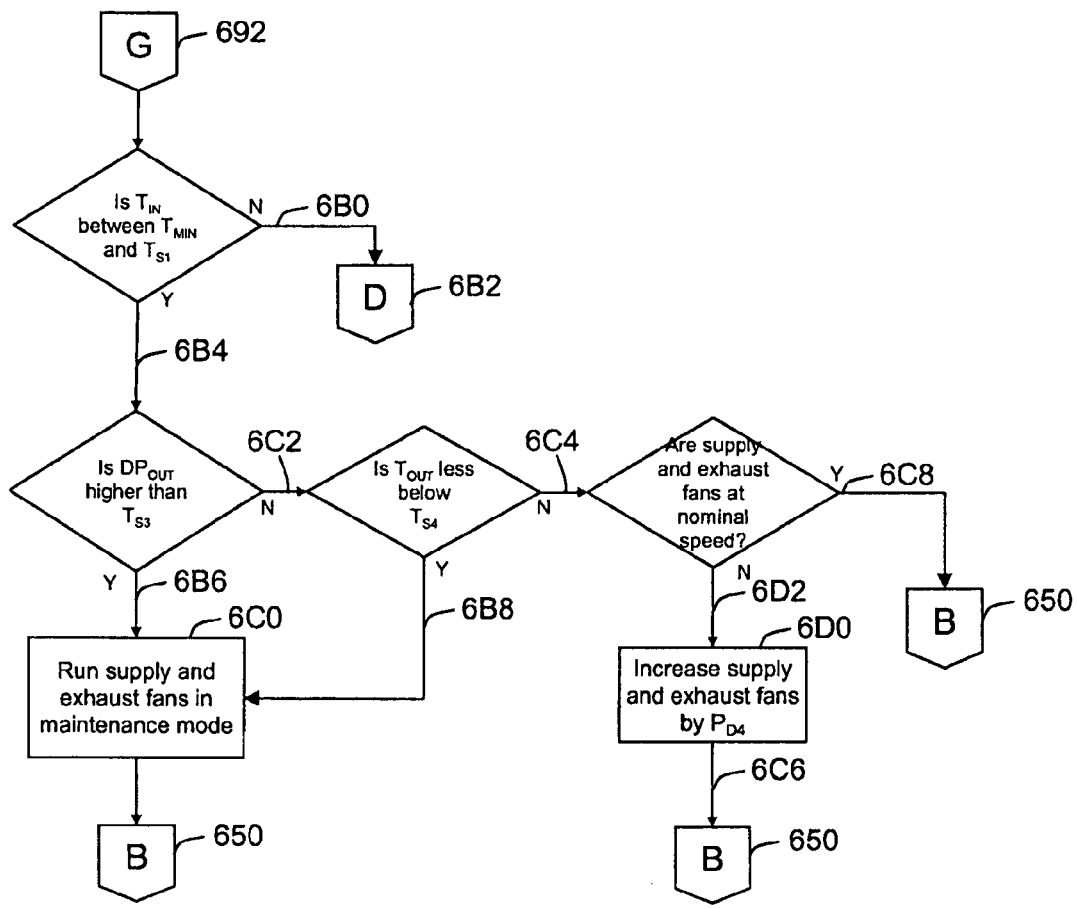

Continuing in FIG. 6E, when the measured humidity inside the building is below the set desired level 618 and the temperature of the incoming supply airflow 114a $T_{IN}$ is below the first preset threshold $T_{S1}$, for example, but not limited to, 10° C., 620 692, and the predetermined minimum temperature $T_{MIN}$, for example, but not limited to, −10° C., 6B0, then a defrost cycle is initiated at 6B2.

If the dew point of the outgoing supply airflow 114b $DP_{OUT}$ is above the third preset threshold $T_{S3}$, for example, but not limited to, 8° C., 6B4, 6B6, or if the temperature of the outgoing supply airflow 114b $T_{OUT}$ is below the fourth preset threshold $T_{S4}$, for example, but not limited to, 14° C., 6B8 then the exhaust fan 106 and the supply fan 104 are run in a maintenance mode 6C0 before continuing to check the self-balance timer 650.

However, if the temperature of the outgoing supply airflow 114b $T_{OUT}$ is below the third preset threshold $T_{S3}$, for example, but not limited to, 8° C., 6C2, and if the temperature of the outgoing supply airflow 114b $T_{OUT}$ is above the fourth preset threshold $T_{S4}$, for example, but not limited to, 14° C., 6C4, then the ventilation system will continue 6C6, 6C8 to check the self-balance timer 650 after an increase of the speed of the exhaust fan 106 and the supply fan 104 by the fourth predetermined amount $P_{D4}$, for example, but not limited to, 5%, 6D0, if they are not currently at their nominal speeds 6D2.

Figure 6F:
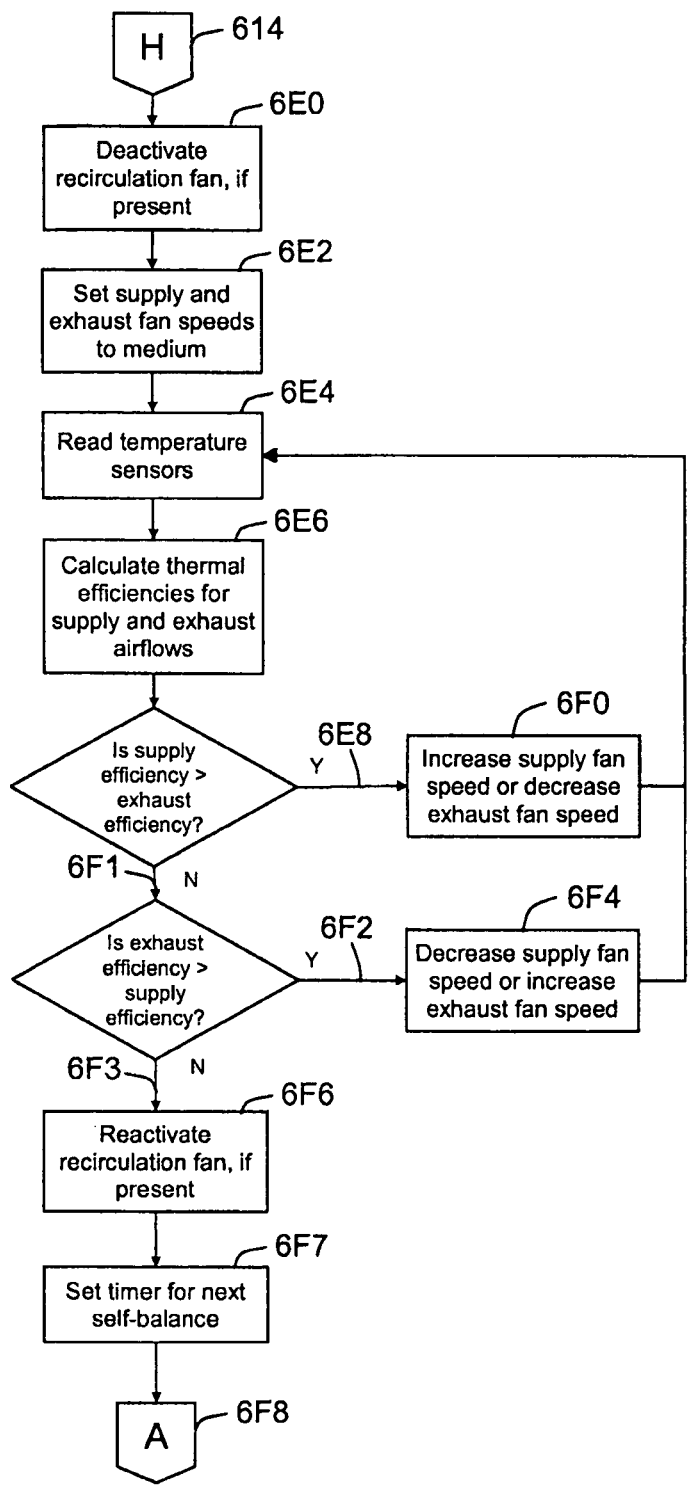

The self-balancing process, which begins at 614 is described in FIG. 6F. The recirculation fan 132, if present, is deactivated 6E0 and the exhaust fan 106 and the supply fan 104 are set to run at a medium speed 6E2. All temperature sensors are read 6E4 and the thermal efficiencies of the device, seen from the supply airflow 107 and exhaust airflow 114, are calculated based on these readings 6E6. If the supply efficiency is found to be greater than the exhaust efficiency 6E8, then the speed of the supply fan 104 may be increased and/or the speed of the exhaust fan 106 may be decreased 6F0 and the self-balance test continues at 6E4. On the other hand, if the exhaust efficiency is found to be higher than the supply efficiency 6F2, then the speed of the exhaust fan 106 may be increased and/or the speed of the supply fan 104 may be decreased 6F4 and the self-balance test continues at 6E4. Finally, if the efficiency calculated using the exhaust outlet temperature is found to be equal 6F1, 6F3, to the efficiency calculated based on the supply outlet temperature within a certain tolerance, the recirculation fan 132 is reactivated 6F6, the timer used to trigger the next self-balance test is set 6F7. The exhaust fan 106, the supply fan 104, and the circulation fan are operated as per setting 6F8.

The process described and the temperatures are used only as examples. They may be changed or adjusted without affecting the nature of the invention. In addition, other inputs may be considered in the described process, such as a manual switch to force the device to operate at high speed.

While particular embodiments of the present invention have been shown and described, changes and modifications may be made to such embodiments without departing from the true scope of the invention, as would be apparent to one of skill in the art.

What is claimed is:

1. A ventilation system comprising:
   a ventilator;
   a first direct current (DC) fan drawing air from an exterior of a building for circulation into an interior of the building, the first DC fan producing a supply airflow through the ventilator;
   a second DC fan drawing a return air from the interior of the building for exhausting to the exterior of the building, the second DC fan producing an exhaust airflow through the ventilator enclosure, said supply airflow and said exhaust airflow undergoing an energy exchange therebetween in the ventilator; and
   a controller controlling a first speed of the first DC fan and a second speed of the second DC fan, the controller including means for calculating a thermal efficiency for each of the supply airflow and the exhaust airflow for balancing the supply airflow and the exhaust airflow, thereby separately adjusting the supply airflow and the exhaust airflow in response to a first input received from a first temperature sensor in the supply airflow positioned upstream of the energy exchange in the ventilator, a second input received from a second temperature sensor in the supply airflow positioned downstream of the energy exchange in the ventilator and a third temperature sensor in an exhaust airflow positioned downstream of the energy exchange in the ventilator, said first, second and third temperature sensors each independently outputting temperature signals to the controller to optimize the supply airflow and the exhaust airflows by balancing the supply airflow and the exhaust airflow;

wherein the supply airflow and the exhaust airflow are balanced if the thermal efficiency of the supply airflow and the thermal efficiency of the exhaust airflow are equal to pre-determined efficiencies.

2. The ventilation system according to claim 1, further comprising a first humidity sensor in the supply airflow positioned upstream of the energy exchange in the ventilator and a second humidity sensor in the supply airflow positioned downstream of the energy exchange in the ventilator, said first and second humidity sensors each independently outputting humidity signals to the controller for use in optimizing the supply airflow and the exhaust airflow.

3. The ventilation system of claim 1, wherein the ventilator comprises at least one energy exchange core.

4. The ventilation system of claim 1, wherein the supply airflow and the exhaust airflow are separate in the ventilator and wherein heat and/or moisture exchange occurs between the supply and exhaust airflows.

5. The ventilation system according to claim 1, further comprising a recirculation fan for drawing a portion of the return air from the interior the building for recirculation in the interior of the building.

6. The ventilation system according to claim 1, further comprising a fourth temperature sensor positioned in the exhaust airflow at a position proximate to the exhaust inlet of the ventilator, the fourth temperature sensor outputting a signal to the controller for use in optimizing the supply airflow and the exhaust airflow.

7. The ventilation system according to claim 1, further comprising a continuous fan speed control.

8. The ventilation system according to claim 1, wherein means for fine control of the fan speed of each of the first and the second DC fan comprises pulse width modulation (PWM).

9. A ventilator comprising:
a ventilator enclosure comprising a supply inlet receiving a supply airflow from an exterior of a building, a supply outlet discharging the supply airflow to the interior of the building, an exhaust inlet receiving an exhaust airflow from an interior of the building, and an exhaust outlet discharging the exhaust airflow to the exterior of the building,
a first direct current (DC) fan drawing supply air through the supply inlet and discharging supply air through the supply outlet, said first DC fan producing a supply airflow through the ventilator enclosure;
a second DC fan drawing return air through the exhaust inlet and discharging the exhaust air from the exterior of the building thereby creating the exhaust airflow through the ventilator enclosure;
a first temperature sensor, proximate to the supply inlet, determining a first temperature of supply air entering the ventilator enclosure;
a second temperature sensor, proximate to the supply outlet, measuring a second temperature of supply air exiting the ventilator enclosure;
a third temperature sensor, proximate to the exhaust outlet, measuring a third temperature of return air exiting the ventilator enclosure; and
a controller controlling the fans and regulating the supply airflow and the exhaust airflow, said controller comprising receiver receiving a first input from the first temperature sensor, a second input from the second temperature sensor, and a third input from a third temperature sensor, means for calculating a thermal efficiency for each of the supply airflow and the exhaust airflow for balancing the supply airflow and the exhaust airflow and drivers for independently adjusting a first fan speed for the first DC fan and a second fan speed for the second DC fan in response to each of said first, second and third inputs, thereby optimizing the supply airflow and the exhaust airflow by balancing the supply airflow and the exhaust airflow,
wherein the supply airflow and the exhaust airflow are balanced if the thermal efficiency of the supply airflow and the thermal efficiency of the exhaust airflow are equal to pre-determined efficiencies.

\* \* \* \* \*

UNITED STATES PATENT AND TRADEMARK OFFICE
CERTIFICATE OF CORRECTION

PATENT NO. : 8,939,827 B2
APPLICATION NO. : 12/671819
DATED : January 27, 2015
INVENTOR(S) : Patrick Paul Boudreau et al.

It is certified that error appears in the above-identified patent and that said Letters Patent is hereby corrected as shown below:

On the title page

Item (75) Inventors: "Patrick Paul Boudreau, Dieppe (CA);
　　　　　　　Michael Boulay, Dieppe (CA)"
should read
　　　　　　　--Patrick Paul Boudreau, Dieppe (CA);
　　　　　　　Michael Boulay, Lutes Mountain M.B. (CA)--.

In the claims

Col. 17, Claim 5, Line 31,
"return air from the interior the building for recirculation in the" should read
--return air from the interior of the building for recirculation in the--; and Col. 18, Claim 9, Line 28,
"ing receiver receiving a first input from the first tempera-" should read
--ing a receiver receiving a first input from the first tempera- --.

Signed and Sealed this
Sixteenth Day of February, 2016

Michelle K. Lee
*Director of the United States Patent and Trademark Office*